(12) United States Patent
Macchietti et al.

(10) Patent No.: US 10,313,425 B2
(45) Date of Patent: *Jun. 4, 2019

(54) COMPUTER-IMPLEMENTED METHOD, MOBILE DEVICE, COMPUTER NETWORK SYSTEM, AND COMPUTER PRODUCT FOR OPTIMIZED AUDIO DATA PROVISION

(71) Applicant: Accenture Global Services Limited, Dublin (IE)

(72) Inventors: Alessandra Macchietti, Rome (IT); Alessandro Puglia, Rome (IT); Manuela Taglieri, Rome (IT); Christian Zomparelli, Pofi (IT); Andrea Pastori, Rome (IT)

(73) Assignee: Accenture Global Services Limited, Dublin (IE)

( * ) Notice: Subject to any disclaimer, the term of this patent is extended or adjusted under 35 U.S.C. 154(b) by 80 days.

This patent is subject to a terminal disclaimer.

(21) Appl. No.: 15/362,114

(22) Filed: Nov. 28, 2016

(65) Prior Publication Data

US 2017/0118272 A1    Apr. 27, 2017

Related U.S. Application Data

(63) Continuation of application No. 13/768,822, filed on Feb. 15, 2013, now Pat. No. 9,509,755.

(30) Foreign Application Priority Data

Feb. 27, 2012    (EP) ..................... 12425041

(51) Int. Cl.
*H04L 29/08*    (2006.01)
*G06F 16/60*    (2019.01)
(Continued)

(52) U.S. Cl.
CPC ............ *H04L 67/06* (2013.01); *G06F 16/116* (2019.01); *G06F 16/60* (2019.01);
(Continued)

(58) Field of Classification Search
CPC .......................... H04L 67/06; G06F 17/3074
See application file for complete search history.

(56) References Cited

U.S. PATENT DOCUMENTS 5,724,410 A    3/1998    Parvulescu et al.
5,835,495 A    11/1998    Ferriere
(Continued)

OTHER PUBLICATIONS

Extended European Search Report for European Application No. 12425041; dated Jul. 16, 2012, 8 pages.
(Continued)

*Primary Examiner* — Davoud A Zand
*Assistant Examiner* — Albert Chiou
(74) *Attorney, Agent, or Firm* — Harrity & Harrity, LLP (57) ABSTRACT

In one aspect, the present application is directed to a computer-implemented method, a mobile device, a computer network system, and a computer-program product for optimized audio data provision. In an aspect, a computer-implemented method for optimized audio data provision on mobile devices is provided. The method may comprise:
  evaluating one or more parameters of a network connection of a mobile device; and
  depending on said evaluation, automatically switching between
    downloading audio data in an audio file from a server in real-time and
    downloading audio data in a text file from the server and performing a text-to-speech application of audio data on the mobile device.

20 Claims, 4 Drawing Sheets

(51) Int. Cl.
  *G06F 16/11* (2019.01)
  *G10L 13/08* (2013.01)
  *H04L 12/26* (2006.01)
  *G06F 17/30* (2006.01)

(52) U.S. Cl.
  CPC .... *G06F 17/3074* (2013.01); *G06F 17/30076* (2013.01); *G10L 13/08* (2013.01); *H04L 43/0888* (2013.01)

(56) References Cited

U.S. PATENT DOCUMENTS

| | | |
|---|---|---|
| 6,345,279 B1 | 2/2002 | Li et al. |
| 6,453,294 B1 | 9/2002 | Dutta et al. |
| 6,564,263 B1 | 5/2003 | Bergman et al. |
| 7,016,409 B2 * | 3/2006 | Unger ................ H04N 21/2343 375/240.02 |
| 9,509,755 B2 | 11/2016 | Macchietti et al. |
| 2002/0034956 A1 | 3/2002 | Mekuria |
| 2002/0144276 A1 | 10/2002 | Radford et al. |
| 2005/0066033 A1 * | 3/2005 | Cheston ................. H04L 29/06 709/225 |
| 2010/0151899 A1 | 6/2010 | Lekutai |
| 2012/0269458 A1 | 10/2012 | Graziosi |

OTHER PUBLICATIONS

Bae, "Bandwidth Measure System Mobile Transport Network User Terminal Receive Packet Serve Stream Medium Data Through Available Current Time", SK Telecom Co LTD, Abstract of KR 20100083496, XP-002679409, Database WPI, Oct. 7, 2012, 2 pages.

\* cited by examiner

COMPUTER-IMPLEMENTED METHOD, MOBILE DEVICE, COMPUTER NETWORK SYSTEM, AND COMPUTER PRODUCT FOR OPTIMIZED AUDIO DATA PROVISION

RELATED APPLICATIONS

This application is a continuation of U.S. patent application Ser. No. 13/768,822, filed Feb. 15, 2013 (now U.S. Pat. No. 9,509,755), which claims priority to European Patent Application No. 12425041.6 filed on Feb. 27, 2012, the contents of which are incorporated herein by reference.

TECHNICAL FIELD

The description is directed generally to mobile applications, so-called apps, for tablet computers and/or smartphones and, in particular, to a computer-implemented method, a mobile device, a computer network system, and a computer-program product for optimized audio data provision.

BACKGROUND

Mobile applications, also called mobile apps or apps, are software applications usually designed to run on mobile devices such as smartphones and/or tablet computers. Mobile apps are usually available through application distribution platforms typically operated by a producer and/or owner of a mobile operating system such as Apple App Store, Android Market, and/or BlackBerry App World.

Audio apps for playing, to a user of a mobile device, audio news and/or other audio data which include textual information are becoming popular, recently. However, quality and/or operability of audio apps is often limited due to problems of the network connection of the mobile device such as a low network speed when broadcasting, communicating, and/or downloading audio data from a server (host) to the mobile device via a (wireless) network, in particular, when the audio data is intended to be played (e.g. read out) directly to the user of the mobile device.

Hence, there is a need to provide improved and optimized functionality when communicating and/or downloading audio data to a mobile device.

SUMMARY

According to one general aspect, a computer-implemented method for optimized audio data provision on mobile devices is provided. The method may comprise:
  evaluating one or more parameters of a (one or more) network connection of a mobile device; and
    depending on said evaluation, automatically switching between
      downloading audio data in an audio file from a server in real-time and
      downloading audio data in a text file from the server and performing a text-to-speech application of audio data on the mobile device.

In other words, audio data (or data for short) can be downloaded as an audio file from a server or as a text file from the server. Audio data hence refers to the content of a file such as an audio file or a text file.

Audio files may be stored on a server in a file format for storing digital auto data. Audio files may be compressed or uncompressed, raw bitstreams or a container format with a defined storage layer. Audio file formats may be for example WAV, WavPAck, Apple Lossless, MPEG, Windows Media Audio Lossless, MP3, ATRAC, and/or Windows Media Audio Lossy.

Contrary to audio files, text files may be stored on the server in a text file format such as ASCII, MIME, and/or .txt files (having various different endings such as for example, .rtf, .doc, .xml, .txt, .xslt, etc.). A text file may be a kind of computer file that is structured as a sequence of lines of electronic text. A text file can exist within a computer file system which may be stored on a server.

Audio data or data, i.e. content of a file which may relate to audio content having textual information such as news can be stored in an audio file and in a text file so that the audio file and the text file may have the substantially the same textual content.

In order to play (e.g. read out) the content, i.e. the audio data of a text file to a user on a computer device such as a mobile device, the audio data in the text file can be transformed using a common text-to-speech application.

A network connection, i.e. a connection of a mobile device such as a smartphone or a tablet computer to a network for access of a remote server of the mobile device 1 is automatically evaluated or analyzed. During evaluation of the network connection, one or more parameters of the network connection are considered. The one or more parameters may comprise a connectivity type (e.g. Bluetooth, WiFi, 3g/UMTS, Edge, LTE) of the network connection, a signal strength, a signal quality (also referred to as link quality), and/or a download speed with regard to downloading a pre-defined file (e.g. a test file having a predefined size, for example between 200 and 1000 kbit/s, preferably 600 kbit/s).

Parameters of one or more different network connections of the mobile device can be evaluated according to the described method.

Switching between the two download modes according to the described method can be performed either in that the server is requested to send the audio file or the text file depending on the evaluation or in that the audio file or the text file is provided by the server based on the performed evaluation.

A fast network connection may be a network connection with an acceptable network speed, for example a network speed of 100 kbit/s or higher. An acceptable signal strength may be a signal strength of 40 dBp/m or higher and an acceptable signal quality may be a signal quality of a BER of 1e06 (i.e. 1 error bit per 1 million bits transferred).

Said automatic analysis and/or evaluation is performed to determine whether to download the audio data directly in an audio file from the server in real-time or to download the audio data in a corresponding text file from the server and transform the downloaded text file using a text-to speech application (also referred to as text-to-speed transformation or a text-to-speed functionality) supported by the mobile device.

The method allows performing an automatic up-front decision whether to download an audio file (e.g. an MP3 file or an MPEG file) for audio data such as audio news and/or other audio data including textual information directly from a server in real-time or to download the corresponding text file and then to transform the text into speech using a text-to-speech application on the mobile device optimized audio data provision on mobile devices. On the one hand, an efficient data download from the server can be guaranteed in case the evaluation of the parameters results in downloading the text file. On the other hand, audio data is played in high quality to the user of the mobile device when the audio file is downloaded from the server. In other words, an efficient and flexible solution for facing the trade-off between high quality of audio data played to users of mobile devices and fast audio data download from a server is provided even if only a slow network connection is available. The evaluation of the network connection parameters is efficient since built-in technology of the mobile device can be used and a flexible, automatic switch between the two download modes based on the automatic network connection analysis is provided. The switching is flexible and effective since the evaluation automatically registers changes to a signal strength and/or in a connectivity type of the network connection.

In an aspect, evaluating the parameters is performed by a mobile application (or mobile app) installable on the mobile device.

In another aspect, evaluating the parameters is performed by the server.

The server can be a single server or a distributed server environment comprising one or more distributed servers such as a server cloud. The server may be part of or referred to as a cloud or cloud environment.

In another aspect, evaluating one or more parameters of a network connection of a mobile device may comprise: downloading a test file from the server; and checking whether a download speed of the downloaded test file is greater than a threshold. In yet another aspect, if the download speed of the downloaded test file is greater than the threshold, the audio data may be downloaded in the audio file from the server In real-time.

In yet another aspect, evaluating one or more parameters of a network connection of a mobile device may comprise: analyzing a signal strength of the network connection; and setting the threshold depending on the signal strength of the network connection.

In yet another aspect, evaluating one or more parameters of a network connection of a mobile device may comprise: analyzing a signal quality of the network connection.

In yet another aspect, evaluating one or more parameters of a network connection of a mobile device may comprise: notifying a change to a signal strength of the network connection; and checking whether the changed signal strength is greater than a pre-defined value for a network connection signal strength.

In yet another aspect, evaluating one or more parameters of a network connection of a mobile device may comprise: checking a connectivity type of the network connection.

In yet another aspect, if the connectivity type is a connectivity type having a slow network speed (i.e. not a fast network speed, for example a network speed of less than 100 kbit/s), the audio data may be downloaded In the text file from the server and performing a text-to-speech transformation of the audio data on the mobile device.

For example, in case the connectivity type is not WiFi-based, the audio data may be downloaded in the text file from the server and a text-to-speech transformation of the audio data is performed on the mobile device by the built-in text-to-speech application (or functionality) supported by the mobile device. Otherwise, if the connectivity type is a WiFi-based connection, evaluation of the one or more parameters according to the described method may be performed.

In yet another aspect, the method as described may be implemented as a mobile application installable on a mobile device. According to another general aspect, a mobile device for optimized audio data provision is provided. The mobile device may comprise:

a mobile application installed on the mobile device, wherein the mobile application is operable to perform the method as described.

According to another general aspect, a computer network system for optimized audio data provision is provided, the computer network system may comprise:

a mobile device having installed thereon a mobile application;

a server storing audio data in an audio file and in a corresponding text file executable by a text-to-speech application; and a network operable to connect the mobile device with the server, wherein either the server or the mobile application is operable to perform the method as described.

In another general aspect there is provided a computer-program product comprising computer readable instructions, which when loaded and run in a computer system and/or computer network system, cause the computer system and/or the computer network system to perform a method as described.

The subject matter described in this specification can be implemented as a method or as a system or using computer program products, tangibly embodied in Information carriers, such as a CD-ROM, a DVD-ROM, a semiconductor memory, signal and/or data stream, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method steps or actions described in this specification. Further the subject matter described In this specification can be implemented using various MRI machines.

Details of one or more implementations are set forth in the accompanying exemplary drawings and exemplary description below. Other features will be apparent from the description and drawings, and from the claims.

In the following, a detailed description of examples will be given with reference to the In the following, a detailed description of examples will be given with reference to the drawings. It should be understood that various modifications to the examples may be made. In particular, elements of one example may be combined and used in other examples to form new examples.

Figure 1:
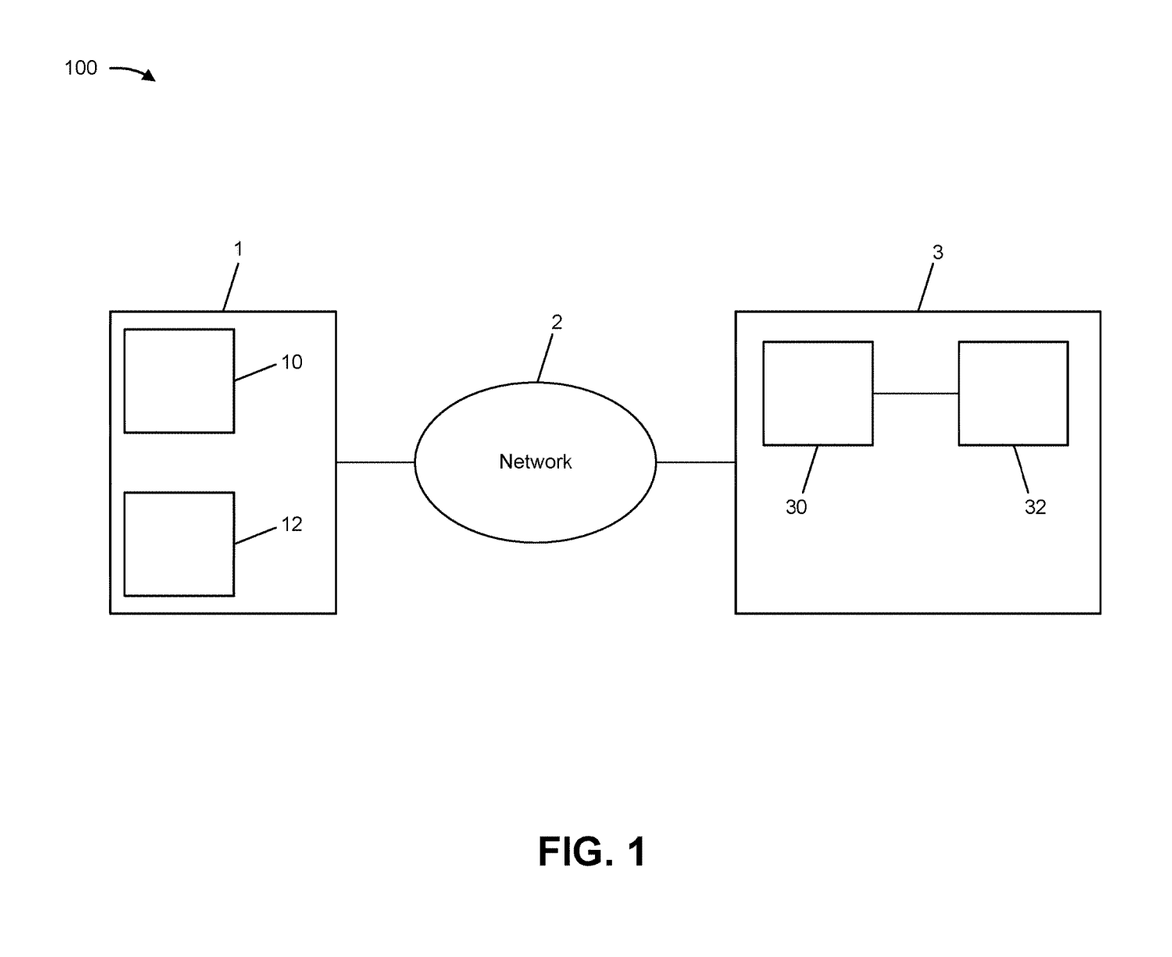
FIG. 1 shows an exemplary block diagram of a computer network system for optimized audio data streaming.

FIG. 1 shows an exemplary computer network system within which optimized audio data provision on mobile devices can be provided and implemented. Audio data include audio news and/or other audio data which include textual information. Audio data can be played (e.g. read out)

to a user of a mobile device which supports an audio interface. Contrary to data such as music, data such as audio news (referred to herein as audio data) frequently change due to actuality and are usually directly downloaded from a server (e.g. a news server) and the user downloading such audio data is usually interested in immediately listening to the downloaded file. However, due to bandwidth problems of the network connection of a mobile device such as a weak signal strength, a low download speed, a rather unacceptable signal or link quality, and/or a connectivity type with a slow download speed, quality of audio data listening is often unsatisfied.

Optimized audio data provision as described below with reference to FIGS. 2 and 3, may be implemented as a mobile app 10. The terms "mobile app" and "app" are used interchangeably in the present application. The app 10 can be downloaded, installed and/or run on a mobile device 1 such as a tablet computer and/or a smartphone. The app 10 can be downloaded and installed from an application distribution platform.

The app 10 may be referred to as a switch app 10 associated with an audio app 12 so that the switch app 10 automatically starts when the audio app 12 is started, runs while the audio app 12 is running and/or is automatically finished when the audio app 12 is finished. The switch app 10 can be implemented as part of an audio app 12 or separate from but connect to the audio app 12 so that the switch app 10 automatically starts when the audio app 12 is started, runs while the audio app 12 is running and/or is automatically finished when the audio app 12 is finished.

The mobile device 1 supports Internet-connected applications and/or browser-based access to the Internet and/or the World Wide Web and can be connected to a network 2 (preferably, a wireless network) through a network connection. The network connection may be, for example WiFi based, UMTS/3G based, LTE based, and/or Edge based. In one example, the mobile device 1 is connected over the network 2 with a server (or host) 3. The mobile device 1 may have installed thereon one or more mobile apps 10, 12.

One app 12 of the apps 10, 12 installed on the mobile device 1 may be an audio app 12 for audio news listing of news data which can be downloaded from the server 3 to the mobile device 1 via the network 2, i.e. over a network connection. Audio data which can be consumed by a user of the mobile device 1 through the audio app 12 may be audio news and/or other audio data including textual information, wherein the text of the audio data can be read out to the user through the audio app 12 on the mobile device 1.

Another app 10 of the apps 10, 12 is associated with the audio app 12 for optimizing audio data provision on the mobile device 1 when accessing the server 3 to download audio data which include textual information from the server 3 to the mobile device 1 over the network 2.

The server 3 may be a news server storing audio data. Audio data may be stored on the server 3 in an audio file 30 and in a corresponding text file 32. In other words, content of news (audio data) can be stored in a text file 32 and in a corresponding audio file 30.

Text files 32 may be stored on the server 3. To play (e.g. read out) audio data stored in the text file 32 in an electronic manner to a user of the mobile device 1, a transformation of the content or data (the audio data as stored in the text file) using available text-to-speech functionality such as the text-to-speech transformation tools (also referred to as text-to-speech applications) supported and/or provided by different mobile operating systems including Android, iOS, Windows Mobile/Phone, Symbian, BlackBerry BBX, BlackBerry 6 OS, BlackBerry 7 OS, etc is used. Text-to-speech applications convert normal language text (e.g. audio data stored in a text file 32) into speech.

Audio files 30 may be stored on the server in a file format for storing digital auto data. Audio files may be compressed or uncompressed, raw bitstreams or a container format with a defined storage layer. Audio file formats may be for example WAV, WavPAck, Apple Lossless, MPEG, Windows Media Audio Lossless, MP3, ATRAC, and/or Windows Media Audio Lossy.

In operation, when a user activates the audio app 12 on the mobile device 1, the switch app 10 may automatically start. Alternatively or additionally, the switch app 10 may periodically check the network connection of the mobile device 1 so that when the audio app 12 is started, audio data is downloaded based on the analysis of the network connection as performed by the switch app 10 according to a method as described below with reference to FIGS. 2 and 3.

Basically, the switch app 10 is operable to analyze the network connection of the mobile device 1 by evaluating one or more parameters of the network connection. Said automatic analysis and/or evaluation is performed to determine whether to download the audio data directly in an audio file 30 from the server 3 in real-time or to download the audio data in a corresponding text file 32 form the server and transform the downloaded text file using text-to speech transformation supported by the mobile device 1.

The audio file 30 can be directly played to the user, for example through the audio app 12, and the text file 32 is converted into speech and played to the user using a text-to-speech transformation provided with the mobile device 1.

The one or more parameters may comprise a connectivity type (e.g. WiFi, 3g/UMTS, Edge, LTE) of the network connection, a signal strength, a signal quality (also referred to as link quality), and/or a download speed with regard to downloading a pre-defined file (e.g. a test file having a predefined size, for example between 100 and 2000 kbit or 200 and 1000 kbit, preferably 600 kbit).

A signal strength may be a measure of the amplitude of the signal that is received at the mobile device 1 over the network connection. A signal (or link) quality may measure the number of packet errors that occur during a data download. For example, the closer a mobile device 1 is to an access point of a WiFi network connection, the higher will be the signal strength, however, the mobile device 1 might have a low signal quality due to a microwave oven and/or a mobile phone in the area causing interference. Conversely, a mobile device 1 may be far away from an access point in a WiFi network connection and therefore receive a low signal strength, but a high signal quality due to the absence of any radio frequency inference, for example.

Figure 2:
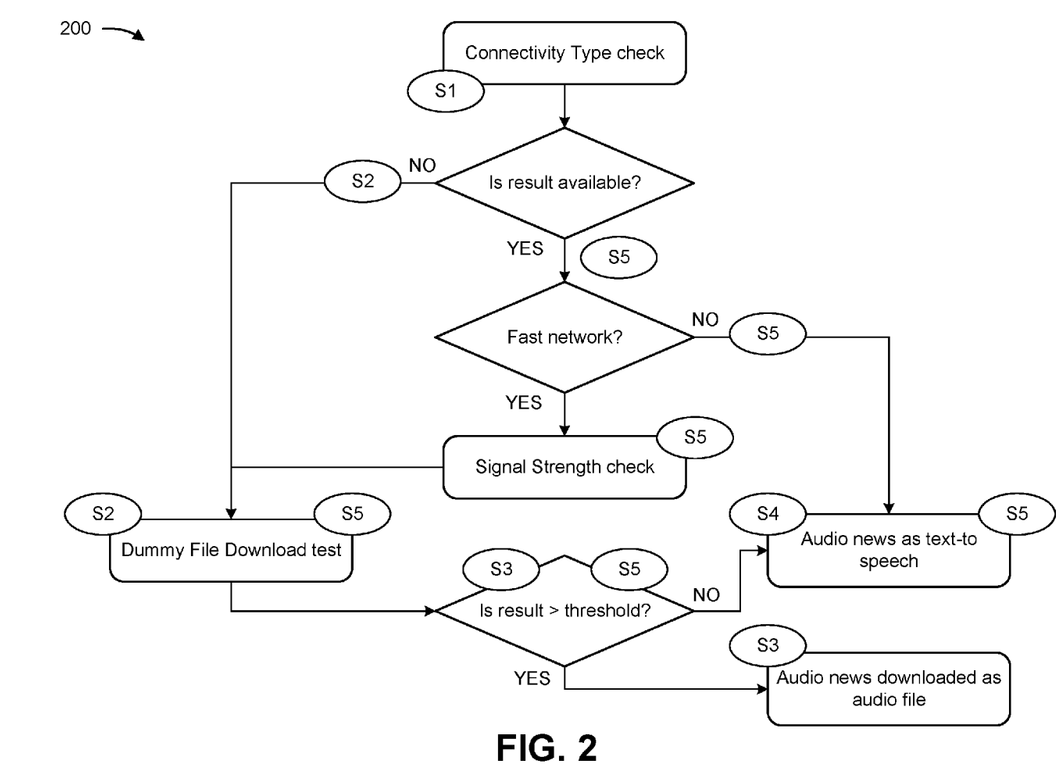
FIG. 2 shows an exemplary flow diagram of a computer-implemented method for optimized audio data streaming when starting an associated audio app.

FIG. 2 shows an exemplary implementation of a method for checking a network connection of a mobile device to a network. The method may be implemented as part of a mobile app such as the switch app 10. The mobile app 10 may be activated when a user of the mobile device 1 requests a download of audio data including textual information such as audio news using an audio app 12, when a user activates the mobile 10, for example, by clicking on an icon identifying the app 10, and/or the mobile app 10 automatically, e.g. periodically, evaluates, checks, and/or analysis the network connection of the mobile device 1 having installed the app 10.

At S1, a connectivity type check of a network connection of a mobile device 1 having installed thereon the switch app 10 is performed. The connectivity type check determines the current (wireless) network available for the mobile device 1.

An available network may include a WiFi-based network, a 3G/UMTS-based network, an Edge-based network, a LTE-based network etc. It is determined, whether the currently available connectivity type can be determined. Built-in functionality of the mobile operating system implemented on the mobile device 1 can be used to check the connectivity type of the mobile device 1. For example, in case the mobile operating system of the mobile device is Android, Android's NetworkInfo class, which describes the status of a network interface of a given type (e.g. "mobile" or "WiFi") can be implemented to check for the connectivity type.

If, at S1, the connectivity type cannot be determined, a customization check is performed by downloading a test file which may, for example, have a size between 400 and 1000 kbit/s, preferably 600 kbit/s, S2. Having downloaded the test file from a server 3 over the network 2, the switch app 10 determines whether the download speed of the test file is greater than a predefined threshold, S3. In an example implementation, the threshold is defined as a download speed of 100 kbit/s. The threshold may have another value, such as a value between 50 kbit/s to 300 kbit/s, or between 80 kbit/s to 200 kbit/s. In particular the threshold may be one of 90 kbit/s, 120 kbit/s, 140 kbit/s, 180 kbit/s, 200 kbit/s.

In case the download speed with which the test file is downloaded is greater than the pre-defined threshold, audio data requested by a user, for example via an audio app 12, is directly downloaded as an audio file 30 from the server 3, S3. Otherwise, if the download speed with which the test file is downloaded is less than or equal to the pre-defined threshold, an audio file requested by a user, for example via an audio app 12, is downloaded as a text file 32 from the server and the audio data is played to the user from the text file 32 using a text-to-speech functionality supported by the mobile operating system of the mobile device 1.

If, at S1, the connectivity type can be determined, it is determined, whether the connectivity type of the network connection of the mobile device 1 relates to a fast network connection having a good network speed, e.g. a network speed of at least 100 kbit/s such as a WiFi-based network, S5.

At S5, in case the connectivity type is a fast network connection, a signal strength analysis of the network connection is performed. Functionality supported and/or provided by the underlying mobile operating system of the mobile device 1 can be used to execute and/or perform a signal strength analysis of the detected network connection. For example, if a WiFi-based network connectivity type is determined at S5 and if the mobile operating system of the mobile device 1 is Android, Android's WifiManager and WifiInfo classes can be implemented to check a signal strength of the determined connectivity type. The WifiManager class provides a primary API for managing several aspects of WI-FI connectivity. Basically, the WifiManager class provides an API for managing access point scan. The WifiInfo class describes the state of a WiFi connection that is active or is in the process of being active. Basically, the WifiInfo class may allow determining the link speed of the connection in Mbps.

In addition to an analysis of the signal strength of the determined connectivity type, the switch app 10 may also download a test file from the server 3 at S5. Similar to step S3, the test file may have a pre-defined size and a test is performed whether the test file is downloaded with a download speed greater than a pre-defined threshold. The threshold may be set depending on a signal strength of the network connection. For example, in case of a high or acceptable signal strength (e.g. 40 dBµ/m or higher), the threshold is lowered (e.g. from 120 kbit/s to 100 kbit/s).

If an outcome of the signal strength analysis and/or the test of the test file download compared to the pre-defined threshold value is positive, the requested audio data is downloaded directly as an audio file 30 from the server 3 in real-time, S3. Otherwise, the requested audio data is downloaded as a text file 32 from the server 3 and played to the user through a built-in text-to-speech functionality of the mobile operating system running on the mobile device 1, S4 and S6.

Figure 3:
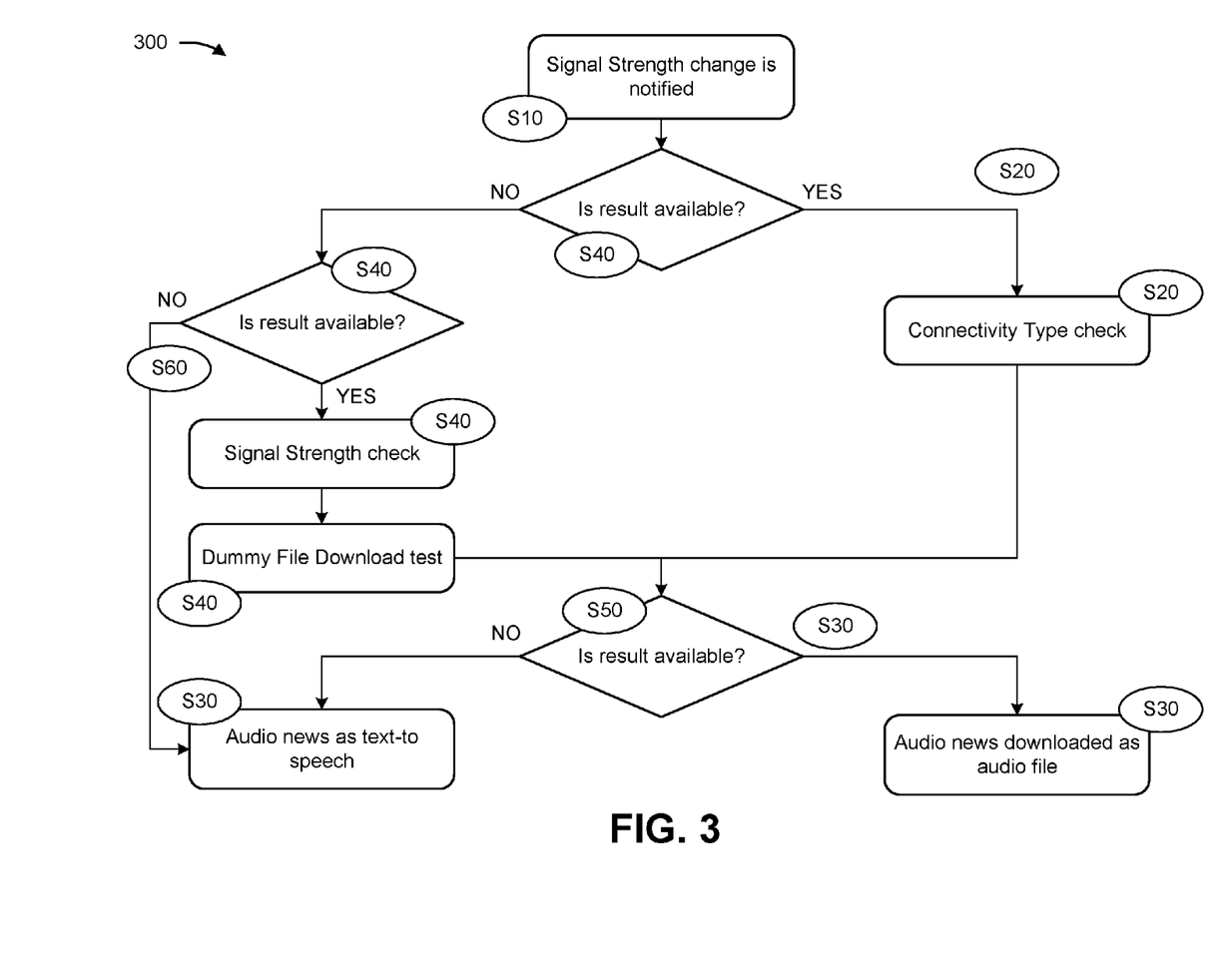
FIG. 3 shows an exemplary flow diagram a computer-implemented method for optimized audio data streaming when running an associated audio app.

FIG. 3 shows an exemplary implementation of the switch app 10 when a signal strength change with regard to a network connection of a mobile device 1 to a network 2 is detected. The switch app 10 may support automatic monitoring of a change in specific telephony states on the mobile device 1, including a service state and/or a signal strength.

The switch app 10 automatically notifies (or detects) a change to a previously determined signal strength of the network connect of the mobile device 1, S10. In an exemplary implementation, the underlying mobile operating system of the mobile device 1 is Android, Android's PhoneStateListner class for monitoring changes in specific telephony states on the mobile device 1 including service state, signal strength, and/or message waiting indicator (voicemail) may be implemented to automatically determine and/or notify a change to the signal strength. It is checked, whether the changed or new signal strength is still acceptable to directly download audio data as audio files 30 from the server 3 via the network 2. An acceptable signal strength may be a signal strength of a network of at least 40 dBp/m.

In case the new signal strength is still acceptable, a connectivity type check is performed, S20 in order to determine a final quality of the network connection 2 of the mobile device 1 to the server 3, S30. Checking the connectivity type of the notified new signal strength may comprise performing one or more or all steps S1 to S6 as described with reference to FIG. 2. Having checked the connectivity type, at S30, it is checked whether a signal quality (also referred to as a link quality) of the network connection is acceptable. The signal quality may be a signal-to-noise ratio and/or expressed in terms of a bit error rate (BER). An acceptable signal quality may relate to a BER of 1e06 (i.e. 1 bit per 1 million bits transmitted).

In case the signal quality is acceptable, audio data can be downloaded directly as an audio file 30 from the server 3 via the network 2, S30. Otherwise, if the quality of the notified new signal strength is determined not to meet the criteria to download an audio file, audio data can be downloaded as a text file 32 from the server 3 via the network 2 to the mobile device 1 and played to the user using a built-in text-to-speech functionality.

In case the new notified signal strength is no longer acceptable, for example, if the notified signal strength is below a pre-defined threshold value, S40, the switch app determines whether the available network 2 is a fast network 2 (e.g. a network connection with a network speed of at least 100 kbit/s, for example a WiFi based network, a LTE based network, and/or a 3G/UMTS based network), S40. At S40, in case the determined network connection is a fast network connection, the fast network connection is analyzed, preferably in combination with a download of a test file from the server 3. At S40, one or more or all of the steps relating to S5 of FIG. 2 can be implemented at S40.

At S50, a signal quality of the network connection is evaluated. If the quality of the signal is acceptable (e.g. a BER of 1e06 or less), audio data is downloaded in a audio file 30 from the server 3 in real-time. Otherwise, audio data is downloaded in a corresponding text file 32 and played to the user using a built-in text-to-speech transformation functionality of the mobile device 1.

In case no fast network connection is determined, S60, audio data is downloaded In a corresponding text file 32 and played to the user using a built-in text-to-speech of the mobile device 1.

The methods described with reference to FIGS. 2 and 3 can be implemented in alternatively and/or in combination as a mobile app installable on a mobile device.

Figure 4:
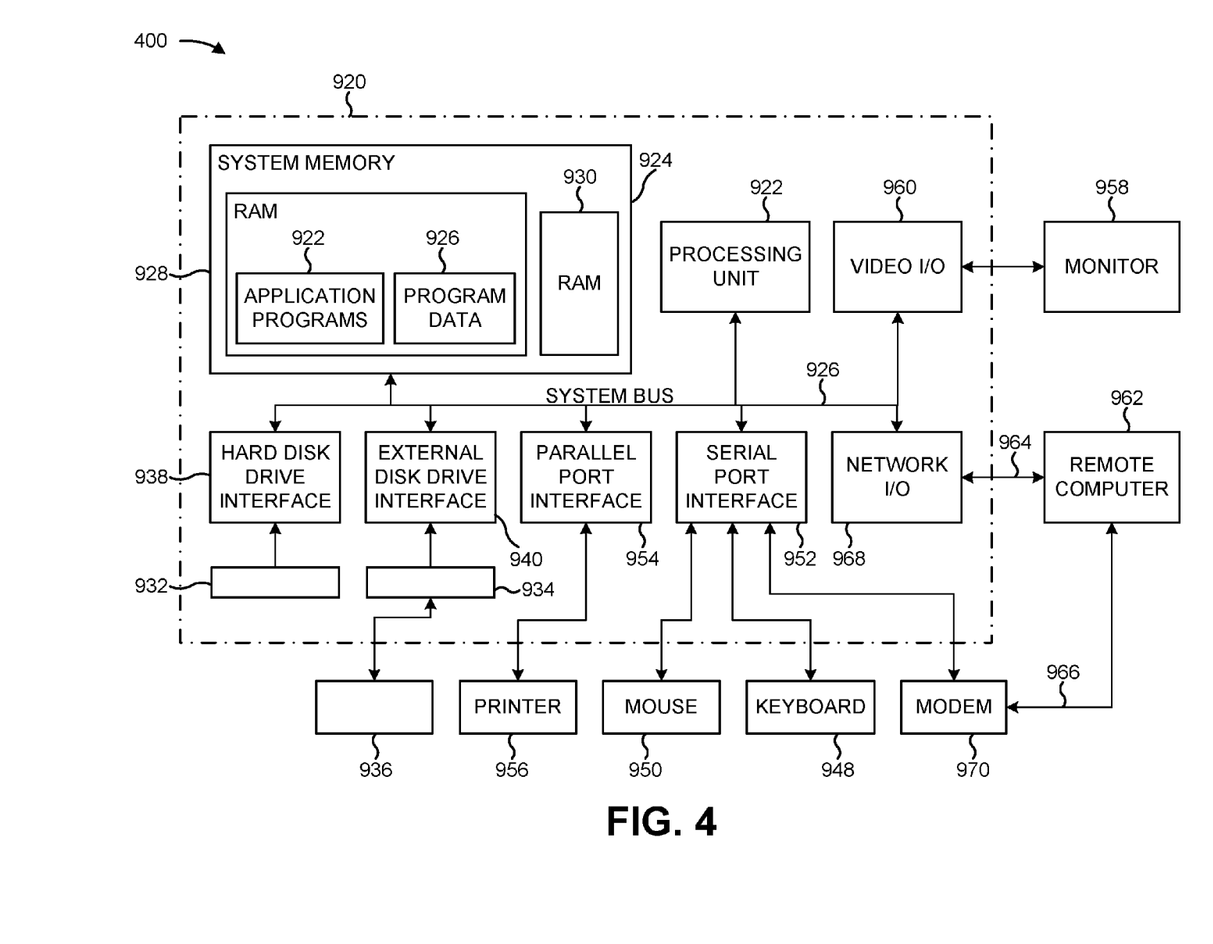
FIG. 4 shows an exemplary computer system and/or computer network system for implementing a computer network, a computer system, and a computer-implemented method as shown in FIGS. 1 to 3.

FIG. 4 shows an exemplary system for implementing the invention including a general purpose computing device in the form of a conventional computing environment 920 (e.g. a personal computer). The conventional computing environment includes a processing unit 922, a system memory 924, and a system bus 926. The system bus couples various system components including the system memory 924 to the processing unit 922. The processing unit 922 may perform arithmetic, logic and/or control operations by accessing the system memory 924. The system memory 924 may store information and/or instructions for use in combination with the processing unit 922. The system memory 924 may include volatile and non-volatile memory, such as a random access memory (RAM) 928 and a read only memory (ROM) 930. A basic input/output system (BIOS) containing the basic routines that helps to transfer information between elements within the personal computer 920, such as during start-up, may be stored in the ROM 930. The system bus 926 may be any of several types of bus structures including a memory bus or memory controller, a peripheral bus, and a local bus using any of a variety of bus architectures.

The personal computer 920 may further include a hard disk drive 932 for reading from and writing to a hard disk (not shown), and an external disk drive 934 for reading from or writing to a removable disk 936. The removable disk may be a magnetic disk for a magnetic disk driver or an optical disk such as a CD ROM for an optical disk drive. The hard disk drive 932 and the external disk drive 934 are connected to the system bus 926 by a hard disk drive interface 938 and an external disk drive interface 940, respectively. The drives and their associated computer-readable media provide non-volatile storage of computer readable instructions, data structures, program modules and other data for the personal computer 920. The data structures may include relevant data for the implementation of the method for optimized audio data streaming, as described above. The relevant data may be organized in a database, for example a relational database management system or an object-oriented database management system.

Although the exemplary environment described herein employs a hard disk (not shown) and an external disk 936, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 936, ROM 930 or RAM 928, including an operating system (not shown), one or more application programs 944, other program modules (not shown), and program data 946. The application programs may include at least a part of the functionality as depicted in FIGS. 1 to 3.

A user may enter commands and information, as discussed below, into the personal computer 920 through input devices such as keyboard 948 and mouse 950. Other input devices (not shown) may include a microphone (or other sensors), joystick, game pad, scanner, or the like. These and other input devices may be connected to the processing unit 922 through a serial port interface 952 that is coupled to the system bus 926, or may be collected by other interfaces, such as a parallel port interface 954, game port or a universal serial bus (USB). Further, information may be printed using printer 956. The printer 956 and other parallel input/output devices may be connected to the processing unit 922 through parallel port interface 954. A monitor 958 or other type of display device is also connected to the system bus 926 via an interface, such as a video input/output 960. In addition to the monitor, computing environment 920 may include other peripheral output devices (not shown), such as speakers or other audible output.

The computing environment 920 may communicate with other electronic devices such as a computer, telephone (wired or wireless), personal digital assistant, television, or the like. To communicate, the computer environment 920 may operate in a networked environment using connections to one or more electronic devices. FIG. 4 depicts the computer environment networked with remote computer 962. The remote computer 962 may be another computing environment such as a server, a router, a network PC, a peer device or other common network node, and may include many or all of the elements described above relative to the computing environment 920. The logical connections depicted In FIG. 4 include a local area network (LAN) 964 and a wide area network (WAN) 966. Such networking environments are commonplace in offices, enterprise-wide computer networks, intranets and the Internet and may particularly be encrypted.

When used in a LAN networking environment, the computing environment 920 may be connected to the LAN 964 through a network I/O 968. When used in a WAN networking environment, the computing environment 920 may include a modem 970 or other means for establishing communications over the WAN 966. The modem 970, which may be internal or external to computing environment 920, is connected to the system bus 926 via the serial port interface 952. In a networked environment, program modules depicted relative to the computing environment 920, or portions thereof, may be stored in a remote memory storage device resident on or accessible to remote computer 962. Furthermore other data relevant to the method for optimization of evaluation of a policy (described above) may be resident on or accessible via the remote computer 962. It will be appreciated that the network connections shown are exemplary and other means of establishing a communications link between the electronic devices may be used. The above-described computing system is only one example of the type of computing system that may be used to implement the method for optimizing audio data streaming.

LIST OF REFERENCE NUMERALS 1 mobile device
2 network
3 server
10 switch app
12 audio app
30 mp3 file
32 text file
S1-S6 connectivity check
S10-S60 notification of change in a signal strength
920 conventional computing environment
922 processing unit 924 system memory
926 system bus
928 random access memory (RAM)
930 read only memory (ROM)
932 hard disk drive
934 external disk drive
936 removable disk
938 hard disk drive interface
940 external disk drive interface
944 one or more application programs
946 program data
948 keyboard
950 mouse
952 serial port interface
954 parallel port interface
956 printer
958 monitor
960 video input/output
962 remote computer
964 local area network (LAN)
966 wide area network (WAN)
968 network I/O
970 a modem

The invention claimed is:

1. A method comprising:
evaluating, by a mobile device, one or more parameters of a network connection associated with the mobile device,
the network connection relating to a connection of the mobile device to a network for access of a server;
determining, by the mobile device, a signal strength of the network connection based on evaluating the one or more parameters;
setting, by the mobile device, a threshold speed based on the signal strength of the network connection;
downloading, by the mobile device, a test file from a server device,
the test file having a pre-defined size;
measuring, by the mobile device, a download speed of the test file;
determining whether the download speed of the test file satisfies the threshold speed; and
selectively downloading, by the mobile device and based on whether the download speed of the test file satisfies the threshold speed, audio data,
the audio data being downloaded as an audio file, from the server device, when the download speed of the test file satisfies the threshold speed, and
the audio data being downloaded as a text file, from the server device, and the text file being converted to the audio data, via a text-to-speech application, when the download speed of the test file does not satisfy the threshold speed.

2. The method of claim 1, further comprising:
determining a signal quality of the network connection based on evaluating the one or more parameters.

3. The method of claim 1, further comprising:
identifying a change to the signal strength of the network connection based on evaluating the one or more parameters; and
determining whether the change to the signal strength of the network connection is greater than a pre-defined value.

4. The method of claim 1, further comprising:
determining a connectivity type of the network connection based on evaluating the one or more parameters.

5. The method of claim 4, where the connectivity type of the network connection is associated with a first network speed, and the method further comprises:
downloading the audio data as the text file when the first network speed satisfies the threshold speed; and
converting the text file to the audio data via the text-to-speech application.

6. The method of claim 1, where the method is implemented by a mobile application provided on the mobile device.

7. The method of claim 1, where instead of evaluating the one or more parameters, the method comprises:
receiving, by the mobile device from the server device, information associated with an evaluation of the one or more parameters,
the evaluation of the one or more parameters being performed by the server device.

8. A mobile device comprising:
a memory to store instructions; and
a processor to execute the instructions to:
evaluate one or more parameters of a network connection associated with the mobile device,
the network connection relating to a connection of the mobile device to a network for access of a server;
determine a signal strength of the network connection based on evaluating the one or more parameters;
set a threshold speed based on the signal strength of the network connection;
download a test file from a server device,
the test file having a predetermined size;
measure a download speed of the test file;
determine whether the download speed of the test file satisfies the threshold speed; and
selectively download, based on whether the download speed of the test file satisfies the threshold speed, audio data,
the audio data being downloaded as an audio file, from the server device, when the download speed of the test file satisfies the threshold speed, and
the audio data being downloaded as a text file, from the server device, and the text file being converted to the audio data, via a text-to-speech application, when the download speed of the test file does not satisfy the threshold speed.

9. The mobile device of claim 8, where the processor is further to:
determine a signal quality of the network connection based on evaluating the one or more parameters.

10. The mobile device of claim 8, where the processor is further to:
identify a change to the signal strength of the network connection based on evaluating the one or more parameters; and
determine whether the change to the signal strength of the network connection is greater than a pre-defined value.

11. The mobile device of claim 8, where the processor is further to:
determine a connectivity type of the network connection based on evaluating the one or more parameters.

12. The mobile device of claim 11, where the connectivity type of the network connection is associated with a first network speed, and the processor is further to:
download the audio data as the text file when the first network speed satisfies the threshold speed; and
convert the text file to the audio data via the text-to-speech application.

13. The mobile device of claim 8, where the instructions stored in the memory are associated with a mobile application.

14. The mobile device of claim 8, where instead of evaluating the one or more parameters, the processor is to:
receive, from the server device, information associated with an evaluation of the one or more parameters,
the evaluation of the one or more parameters being performed by the server device.

15. A non-transitory computer-readable medium storing instructions, the instructions comprising:
one or more instructions which, when executed by a processor of a mobile device, cause the processor to:
evaluate one or more parameters of a network connection associated with the mobile device,
the network connection relating to a connection of the mobile device to a network for access of a server;
determine a signal strength of the network connection based on evaluating the one or more parameters;
set a threshold speed based on the signal strength of the network connection;
download a test file from a server device,
the test file having a pre-determined size;
measure a download speed of the test file;
determine whether the download speed of the test file satisfies the threshold speed; and
selectively download, based on whether the download speed of the test file satisfies the threshold speed, audio data,
the audio data being downloaded as an audio file, from the server device, when the download speed of the test file satisfies the threshold speed, and
the audio data being downloaded as a text file, from the server device, and the text file being converted to the audio data, via a text-to-speech application, when the download speed of the test file does not satisfy the threshold speed.

16. The non-transitory computer-readable medium of claim 15, where the instructions further comprise:
one or more instructions which, when executed by the processor, cause the processor to:
determine a signal quality of the network connection based on evaluating the one or more parameters.

17. The non-transitory computer-readable medium of claim 15, where the instructions further comprise:
one or more instructions which, when executed by the processor, cause the processor to:
identify a change to the signal strength of the network connection based on evaluating the one or more parameters; and
determine whether the change to the signal strength of the network connection is greater than a pre-defined value.

18. The non-transitory computer-readable medium of claim 15, where the instructions further comprise:
one or more instructions which, when executed by the processor, cause the processor to:
determine a connectivity type of the network connection based on evaluating the one or more parameters.

19. The non-transitory computer-readable medium of claim 18, where the connectivity type of the network connection is associated with a first network speed, and the instructions further comprise:
one or more instructions which, when executed by the processor, cause the processor to:
download the audio data as the text file when the first network speed satisfies the threshold speed; and
convert the text file to the audio data via the text-to-speech application.

20. The method of claim 6, where the mobile application is a switch application,
the switch application being associated with an audio application, and
the switch application being automatically started when the audio application is started.

\* \* \* \* \*